(12) United States Patent
Yamada et al.

(10) Patent No.: US 8,220,336 B2
(45) Date of Patent: Jul. 17, 2012

(54) SERVO-TYPE VIBRATION DETECTOR

(75) Inventors: Tomoharu Yamada, Kanagawa (JP);
Kiichiro Nemoto, Kanagawa (JP)

(73) Assignee: Mitutoyo Corporation, Kanagawa (JP)

(*) Notice: Subject to any disclaimer, the term of this patent is extended or adjusted under 35 U.S.C. 154(b) by 250 days.

(21) Appl. No.: 12/788,875

(22) Filed: May 27, 2010

(65) Prior Publication Data
US 2010/0326197 A1 Dec. 30, 2010

(30) Foreign Application Priority Data

Jun. 30, 2009 (JP) .................................. 2009-155174

(51) Int. Cl.
*G01H 11/06* (2006.01)
(52) U.S. Cl. ........................................ 73/654; 73/649
(58) Field of Classification Search .................... 73/649, 73/463, 514.15, 514.21, 514.36, 654
See application file for complete search history.

(56) References Cited

U.S. PATENT DOCUMENTS

| | | | | |
|---|---|---|---|---|
| 4,185,503 A | * | 1/1980 | Saito | 73/653 |
| 4,779,463 A | * | 10/1988 | Woodruff | 73/497 |
| 4,811,492 A | * | 3/1989 | Kakuta et al. | 33/366.25 |
| 5,065,626 A | * | 11/1991 | Hanson | 73/497 |
| 6,473,159 B1 | * | 10/2002 | Wakui et al. | 355/53 |
| 6,493,952 B1 | * | 12/2002 | Kousek et al. | 33/286 |

FOREIGN PATENT DOCUMENTS

| | | |
|---|---|---|
| JP | 2003-004522 | 1/2003 |
| JP | 2009-020057 | 1/2009 |

* cited by examiner

*Primary Examiner* — J M Saint Surin
(74) *Attorney, Agent, or Firm* — Greenblum & Bernstein, P.L.C.

(57) ABSTRACT

A movable plate is provided to a pendulum displaceable by external vibration. A fixed plate is provided to a position opposite to the movable plate. A displacement detector detects an electrostatic capacitance between the plates. A servo amplifier supplies to a force coil, a current in an amount associated with the detection result. A current circuit and a load resistor of the force coil convert the current into a detection signal and output the signal. When the movable plate and the fixed plates, which are conducted to each other, are contacted, the electrostatic capacitance between the plates is removed. A processor detects a change in the detection signal due to the removal of the electrostatic capacitance, and then determines that the plates are contacted.

3 Claims, 3 Drawing Sheets

SERVO-TYPE VIBRATION DETECTOR

CROSS-REFERENCE TO RELATED APPLICATIONS

The present application claims priority under 35 U.S.C. §119 of Japanese Application No. 2009-155174 filed on Jun. 30, 2009, the disclosure of which is expressly incorporated by reference herein in its entirety.

BACKGROUND OF THE INVENTION

1. Field of the Invention

The present invention relates to a servo-type vibration detector.

2. Description of Related Art

A conventional servo-type vibration detector is an apparatus that detects vibration using a servo mechanism, in which a position of a pendulum is controlled. When the pendulum is displaced because of external vibration, a current is supplied to a coil wound around the pendulum, and thereby the pendulum is held at a predetermined position. The current supplied to the coil at the time detects vibration amounts, such as a speed, a rate of acceleration, and the like.

The servo-type vibration detector of this type is provided with a movable plate and a fixed plate, the movable plate being provided to a coil bobbin functioning as a pendulum supported by a support spring and housed in a main body case, the fixed plate being provided to an internal periphery of the main body case. The plates are provided opposite to each other. A rate of acceleration applied to the coil bobbin is detected, based on measurement of a change amount of electrostatic capacitance between the movable plate and the fixed plate. Further, the vibration detector described above is directly mounted to a measurement object, such as a seismic measurement device, a liquid crystal correction laser apparatus, a vibration isolator, and the like. Since the vibration detector is mostly mounted to a location difficult to directly access, such as in the earth or inside the apparatus, it can not be easily removed for inspection and maintenance. Thus, a test coil is wound around the coil bobbin, and then a predetermined test signal is applied to the test coil to vibrate the coil bobbin for testing. Thereby, it is confirmed whether the vibration detector operates normally (for example, Related Art 1). For the servo-type vibration detector as above, insulation is provided in order to avoid conduction between the plates (for example, Related Art 2).

[Related Art 1] Japanese Patent Laid-open Publication No. 2009-020057

[Related Art 2] Japanese Patent Laid-open Publication No. 2003-004522

When the vibration detectors disclosed in Related Arts above are applied with vibration at a rate of acceleration greater than a maximum rating of the vibration detectors, that is, vibration greater than an amplitude in which vibration can be detected, electrodes may collide with each other. Since the electrodes are insulated, an electrostatic capacitance between the electrodes is retained at a certain capacitance even during the collision. It is thus not easy to detect whether or not a contact is made, particularly when the contact is momentary. It is difficult to recognize whether or not a detection limit of the vibration detectors is exceeded. In addition, even when a rate of acceleration within a detectable range of the vibration detectors is applied to the pendulum in the above-described test with test vibration, the electrodes may collide in a case in which a structure of the vibration detectors is deformed due to aging degradation of the vibration detectors or a significant impact thereto. It is also difficult to easily determine a contact of the electrodes under the circumstance above, thus leading to an erroneous decision on whether the vibration detectors need to be replaced.

SUMMARY OF THE INVENTION

In order to address the above-described conventional problems, the present invention provides a servo-type vibration detector capable of accurately determining properties and statuses of the vibration detector.

In order to solve the problems, a first aspect of the invention provides a servo-type vibration detector including a pendulum supported by a fixed member and displaceable by external vibration; a movable electrode provided to the pendulum; a driver driving the pendulum; a fixed electrode provided to a position opposite to the movable electrode; an electrostatic capacitance detector detecting an electrostatic capacitance between the movable electrode and the fixed electrode; a current supplier supplying to the driver, a current in an amount associated with a detection result of the electrostatic capacitance detector, and thereby displacing and driving the pendulum to a predetermined neutral position; a detection signal outputter outputting a detection signal associated with the amount of the current supplied by the current supplier; a remover removing a charge between the electrodes, when the movable electrode and the fixed electrode are contacted; and an electrode contact determinator determining an electrode contact by detecting that the detection signal output from the detection signal outputter changes to a detection signal associated with the current supplied from the current supplier in an amount associated with the removed charge. The electrode contact determinator determines the electrode contact when a predetermined determination time elapses in a detection state, after detecting the change to the detection signal associated with the current supplied from the current supplier in the amount associated with the removed charge.

A second aspect of the invention provides the servo-type vibration detector according to the first aspect, the detection signal outputter outputs a voltage in an amount associated with the amount of the current supplied by the current supplier; and the electrode contact determinator determines the electrode contact when a difference in change of the voltage exceeds a predetermined threshold, the voltage being output per a predetermined time by the detection signal outputter.

A third aspect of the invention provides a servo-type vibration detector including a pendulum supported by a fixed member and displaceable by external vibration; a movable electrode provided to the pendulum; a driver driving the pendulum; a fixed electrode provided to a position opposite to the movable electrode; an electrostatic capacitance detector detecting an electrostatic capacitance between the movable electrode and the fixed electrode; a current supplier supplying to the driver, a current in an amount associated with a detection result of the electrostatic capacitance detector, and thereby displacing and driving the pendulum to a predetermined neutral position; a detection signal outputter outputting a detection signal associated with the amount of the current supplied by the current supplier; a remover removing a charge between the electrodes, when the movable electrode and the fixed electrode are contacted; and an electrode contact determinator determining an electrode contact by detecting that the detection signal output from the detection signal outputter changes to a detection signal associated with the current supplied from the current supplier in an amount associated with the removed charge. The detection signal outputter outputs a voltage in an amount associated with the amount of the current supplied by the current supplier. The electrode contact determinator determines the electrode contact when a difference in change of the voltage exceeds a predetermined threshold, the voltage being output per a predetermined time by the detection signal outputter.

The present invention can provide the servo-type vibration detector capable of accurately determining properties and statuses of the vibration detector.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein.

DETAILED DESCRIPTION OF PREFERRED EMBODIMENTS

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description is taken with the drawings making apparent to those skilled in the art how the forms of the present invention may be embodied in practice.

Figure 1:
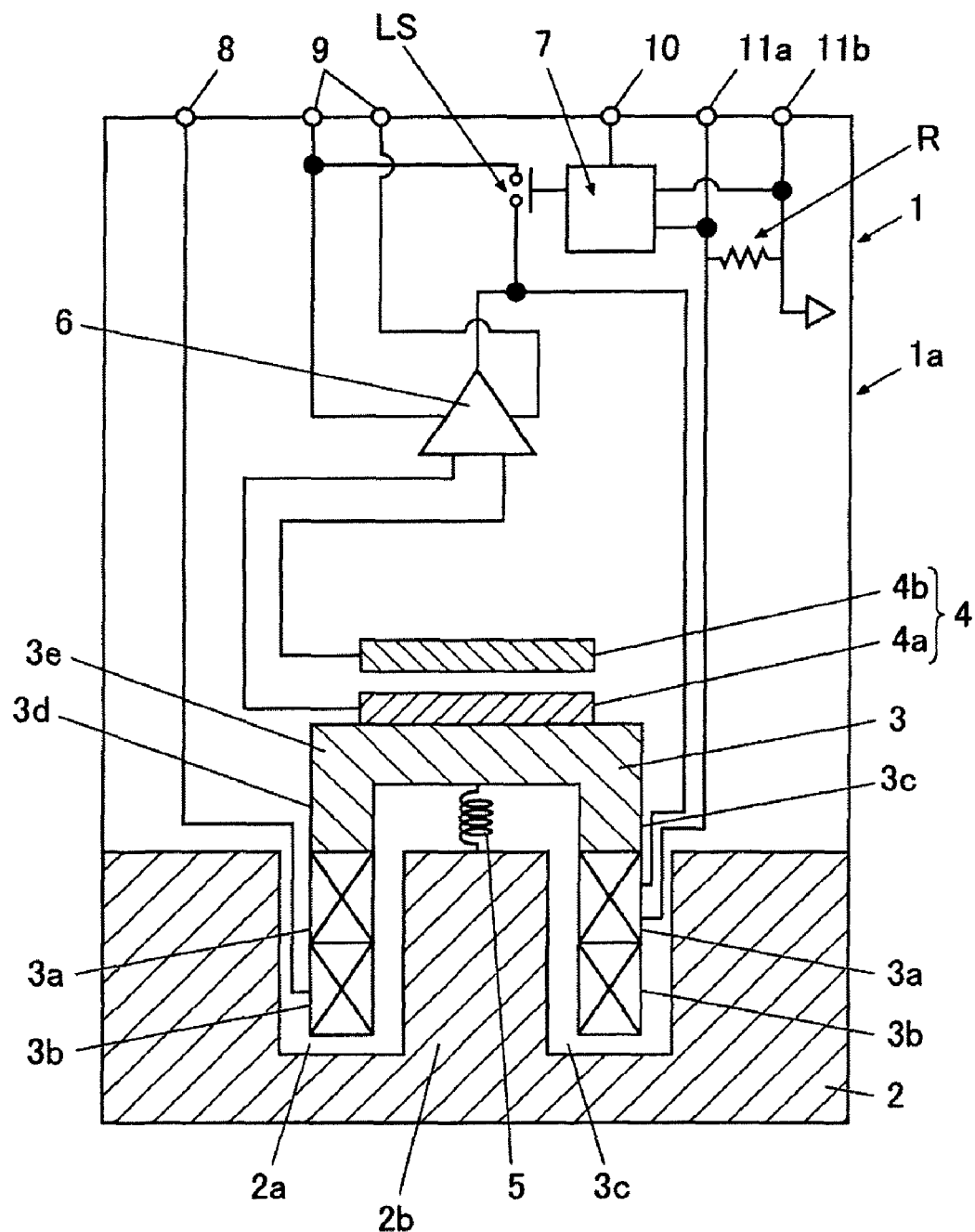
FIG. 1 is a pattern diagram of a structure of a vibration detector according to the present invention.

The embodiments of the present invention are explained below with reference to the drawings. FIG. 1 is a pattern diagram illustrating a schematic view of a vibration detector 1.

As shown in FIG. 1, the vibration detector 1 has a main body case 1$a$; a magnet 2 fixedly attached to the main body case 1$a$; a pendulum 3 displaced by external vibration; a displacement detector 4 detecting displacement of the pendulum 3; a support spring 5 displaceably supporting the pendulum 3; a servo amplifier 6 supplied with a signal input from the displacement detector 4 and supplying a current in an amount associated with the input signal in order to drive the pendulum 3; and a processor 7 supplied with a detection signal converted from the current supplied from the servo amplifier 6.

The magnet 2 is provided in a middle portion with a recess 2$a$ having a circular shape. A column-shaped projection 2$b$ is projected upward in a middle portion of the recess 2$a$. The pendulum 3 has a cylindrical shape having a bottom, and includes a peripheral surface portion 3$d$ having a cylindrical shape, an upper surface portion 3$e$ closing an opening on un upper surface side, and a housing 3$c$ having a recess shape opening on a lower surface side. At a lower portion of the peripheral surface portion 3$d$, a force coil 3$a$ and a test coil 3$b$ are wound and vertically provided in parallel. As shown in FIG. 1, the pendulum 3 is provided in the main body case 1$a$, such that the projection 2$b$ is housed in the housing 3$c$. The pendulum 3 is connected by the support spring 5 between an internal surface of the upper surface portion 3$e$ and an upper surface of the projection 2$b$. Thereby, the pendulum 3 is displaceably supported against the magnet 2. Further, the pendulum 3 is provided, such that at least the force coil 3$a$ and the test coil 3$b$ are housed in the recess 2$a$.

The force coil 3$a$ is connected to the servo amplifier 6. When a current is supplied from the servo amplifier 6, an electromagnetic force is generated by a function of the magnet 2, and thus the pendulum 3 is driven. The test coil 3$b$ tests whether or not the pendulum 3 operates normally. When a current is supplied externally through a test signal inputter 8, an electromagnetic force is generated by the function of the magnet 2, and thus the pendulum 3 is driven. As described above, the force coil 3$a$ and the magnet 2 constitute a driver driving the pendulum 3.

In the structure described above, supplying the current to the test coil 3$b$ or to the force coil 3$a$ as the driver, moves the pendulum 3 by the electromagnetic force.

The displacement detector 4 has a movable plate 4$a$ and a fixed plate 4$b$, the movable plate 4$a$ being mounted, as a movable electrode, to an external surface of the upper surface portion 3$e$ of the pendulum 3 functioning as a capacitor, the fixed plate 4$b$ being provided, as a fixed electrode, opposite to an upper surface of the movable plate 4$a$ and being mounted to a fixed portion (not shown in the drawing) of the main body case 1$a$. The movable plate 4$a$ and the fixed plate 4$b$ respectively output a signal to the servo amplifier 6. An electric capacitance of the plates is variable respectively according to a distance between the plates. An output signal level to the servo amplifier 6 thus fluctuates according to the electric capacitance of the respective plates. Specifically, an electrostatic capacitance between the plates is identifiable, based on the electric capacitance of the movable plate 4$a$ and the fixed plate 4$b$. In other words, the displacement detector 4 outputs a displacement signal to the servo amplifier 6, the displacement signal allowing identification of a detection result of the electrostatic capacitance variable depending on the distance between the movable plate 4$a$ and the fixed plate 4$b$. As described above, the displacement detector 4 constitutes an electrostatic capacitance detector detecting the electrostatic capacitance between the movable electrode and the fixed electrode. The movable plate 4$a$ and the fixed plate 4$b$ are provided so as to be conducted when being contacted with each other. When the movable plate 4$a$ and the fixed plate 4$b$ are contacted and conducted with each other, a charge between the plates is removed. At the time, a signal level output from the movable plate 4$a$ and the fixed plate 4$b$ is equal. When the movable plate 4$a$ and the fixed plate 4$b$ are apart, a charge is generated again between the plates, since the plates are supplied with power and have a constant amount of electric capacitance. When the pendulum 3 is positioned at a predetermined neutral position, the signal level output from the movable plate 4$a$ and the fixed plate 4$b$ is also equal. As described above, the movable plate 4$a$ and the fixed plate 4$b$ constitute a remover removing a charge between the electrodes when the movable electrode and the fixed electrode are contacted. In the present embodiment, aluminum is used as material of the movable plate 4$a$ and the fixed plate 4$b$. Alternatively, another conducting body may be used. A coated conducting substance may also be used. Further, in order to prevent wear due to contact, a coating agent formed of conducting material may be applied to a surface.

The servo amplifier 6 is operated by an external power supply via a power inputter 9. A current in an amount associated with a displacement amount of the pendulum 3 is supplied to the force coil 3$a$ by the displacement signal from the displacement detector 4. Specifically, the servo amplifier 6 compares the electric capacitance of the movable plate 4a and the fixed plate 4b, and supplies to the force coil 3a, a current in an amount associated with the comparison result. At the time, the servo amplifier 6 supplies current, such that a force is generated in a direction opposite to a displacement direction (off direction) of the pendulum 3. As a result, the pendulum 3 is displaced to a predetermined neutral position, which is a zero position. As described above, the servo amplifier 6 constitutes a current supplier supplying to the driver, the current in an amount associated with the detection result of the electrostatic capacitance detector, and thus displacing and driving the pendulum to the predetermined neutral position.

In the structure described above, when the pendulum 3 is displaced from the neutral position, or the zero position, as vibration is supplied thereto, the displacement detector 4 detects the displacement amount. Then, when the detection signal associated with the displacement amount is input to the servo amplifier 6, the servo amplifier 6 functions so as to supply the current to the force coil 3a. As a result, the force coil 3a generates the electromagnetic force by the function of the magnet 2. The force in the direction opposite to the displacement direction of the pendulum 3 is then generated, and the pendulum 3 is returned to the neutral position again.

The force coil 3a is electrically connected to detection signal outputters 11a and 11b, which output a signal associated with an amount of the current applied to the force coil 3a. Specifically, in order to measure a current value applied to the force coil 3a, a load resistor R is provided to a current circuit of the force coil 3a, and a voltage-converted signal is output from the detection signal outputters 11a and 11b. In other words, a signal associated with the amount of the current applied to the force coil 3a is output by the current circuit and the load resistor R of the force coil 3a. The output value corresponds to the current value applied to the force coil 3a, the current value fluctuating according to the distance between the movable plate 4a and the fixed plate 4b. Measuring the output value thus detects a rate of acceleration applied to the pendulum 3. The voltage-converted signal is also input to the processor 7 hereinafter described. As described above, the current circuit and the load resistor R of the force coil 3a constitute a detection signal outputter outputting the detection signal associated with an amount of the current supplied by the current supplier.

As the above-described voltage-converted detection signal is input, the processor 7 detects that an input value thereof is 0. The processor 7 has a CPU performing predetermined computation, a ROM storing programs for control and data, and a RAM used as a work area (none are shown in the drawing). Further, when detecting that the input value is 0, the processor 7 determines whether or not the movable plate 4a and the fixed plate 4b are contacted. When determining that the plates are contacted, the processor 7 outputs a predetermined signal through a plate contact signal outputter 10. The signal can be connected to a predetermined alarm, for example, so as to alarm a worker that the plates are contacted. The processor 7 is electrically connected to a limit switch LS. Based on the determination result on whether or not the movable plate 4a and the fixed plate 4b are contacted, the processor 7 drives the limit switch LS so as to be displaced from an open status to a close status.

The limit switch LS supplies power to the force coil 3a, the power being input through the power inputter 9. The limit switch LS supplies the power to the force coil 3a in the close status. The limit switch LS is used to control the allowance of the power supply to the force coil 3a in the present embodiment. Any component may be used, however, as long as the component is capable of controlling the power supply. A transistor may be used, for example.

Figure 2:
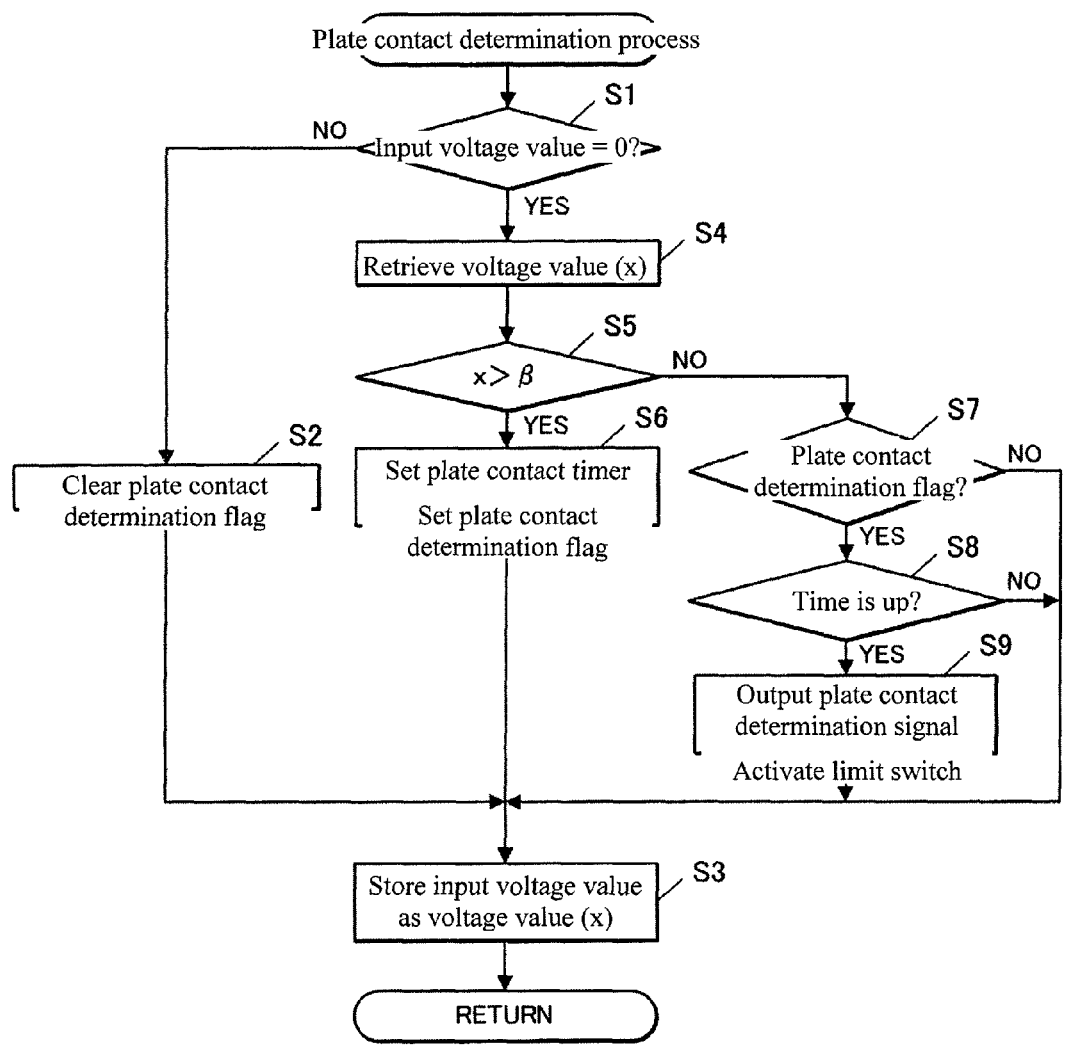
FIG. 2 is a flowchart illustrating operations according to the present invention.

In the vibration detector 1 having the above-described structure, control performed when the movable plate 4a and the fixed plate 4b are contacted is explained below. As a process executed to determine whether or not the movable plate 4a and the fixed plate 4b are contacted, the processor 7 performs a plate contact determination process, as shown in FIG. 2. The plate contact determination process is executed every predetermined time (t1).

In the plate contact determination process, the processor 7 first determines whether or not the input value of the above-described voltage-converted detection signal input to the processor 7 is 0 (Step S1), as shown in FIG. 2. When the movable plate 4a and the fixed plate 4b are contacted, a charge between the plates is removed, and then the amount of the current supplied from the servo amplifier 6 is substantially 0. Accordingly, the input value of the signal to the processor 7 is 0. In determining whether or not the input value of the signal is 0 (Step S1), the processor 7 clears a plate contact determination flag (Step S2) when determining that the value is not 0. Thereafter, the processor 7 stores the input value of the signal in a predetermined memory area as a voltage value (x) used for determination (Step S3), and ends the process. The voltage value (x) stored in Step S3 is retrieved in Step S4 hereinafter described.

Figure 3A:
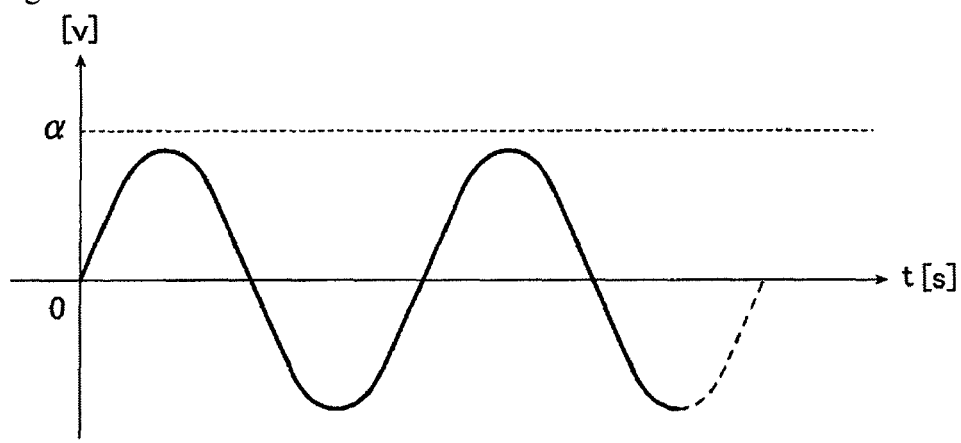
FIG. 3A to 3C illustrate waveforms of a detection signal generated by a current circuit and a load resistor of a force coil.
Figure 3B:
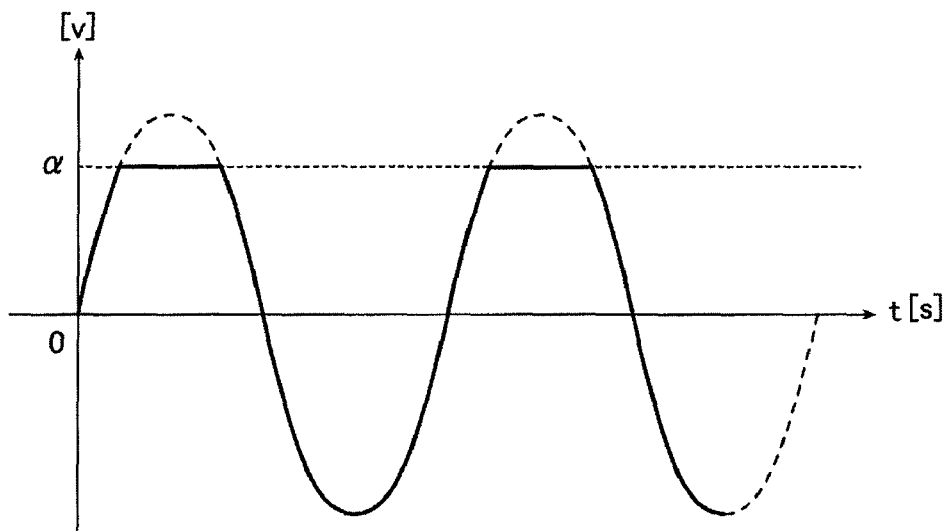
Figure 3C:
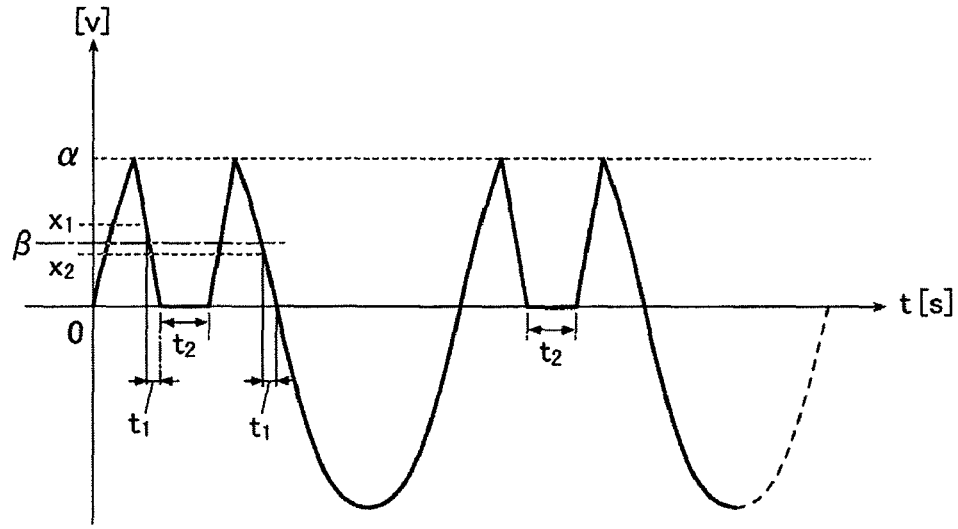

Meanwhile, when determining in Step S1 that the input value of the signal is 0, the processor 7 retrieves the voltage value (x) stored in Step S3 (Step S4). Thereafter, the processor 7 determines whether or not the voltage value (x) retrieved in Step S4 is greater than a constant $\beta$ (Step S5). The constant $\beta$ herein is any value less than a constant $\alpha$, which is a limit point of an amplitude of the pendulum. Specifically, the constant $\alpha$ is a voltage value converted from the current supplied from the servo amplifier to the force coil 3a, at a maximum amplitude before the movable plate 4a and the fixed plate 4b are contacted. It is preferable that a value be set to the constant $\beta$, such that the value is sufficient to detect that the input voltage value is substantially displaced in accordance with the plate contact. Operations when the movable plate 4a and the fixed plate 4b are contacted are explained below with reference to FIG. 3C. When the movable plate 4a and the fixed plate 4b are contacted, the charge between the plates is rapidly removed, and thus the input value of the signal is 0. At the time, the processor 7 determines in Step S1 that the input value of the signal is 0; retrieves the input voltage value stored before the time t1 (Step S4); and determines whether or not the value is greater than the threshold $\beta$ (Step S5). In this case, the input voltage value indicates x1 before the time t1, as shown in FIG. 3C, and the value is greater than the threshold $\beta$. When the pendulum 3 is displaced to the neutral position, meanwhile, the signal level of the movable plate 4a and the fixed plate 4b is equal, and thus the input value of the signal is 0. At the time, the processor 7, as described above, determines in Step S1 that the input value of the signal is 0; retrieves the input voltage value stored before the time t1 (Step S4); and determines whether or not the value is greater than the threshold $\beta$ (Step S5). In this case, the input voltage value indicates x2 before the time t1, as shown in FIG. 3C, and the value is less than the threshold $\beta$. This is because, as the pendulum 3 is displaced, a difference of the electric capacitance between the movable plate 4a and the fixed plate 4b gradually changes. A change amount of the signal level per time t1 does not exceed the threshold P. As described above, in a case in which the voltage value (x) is greater than the constant $\beta$ when the input voltage value is 0, the processor 7 determines that the input voltage value is displaced to 0, based on that the charge between the plates is removed at once as the movable plate 4a and the fixed plate 4b are contacted. When the voltage value (x) is not greater than the constant β, more specifically, when a difference is small between the preceding input voltage value and the current input voltage value, the processor 7 determines that it is indicated that the input voltage value is 0, based on that the pendulum 3 is moved to the predetermined neutral position in normal vibration operation, or that the input voltage value remains 0 as the contact status is maintained between the movable plate 4a and the fixed plate 4b.

When determining in Step S5 that the voltage value (x) is greater than the constant 13, the processor 7 sets a plate contact timer (t2; for example, 1 ms); sets the plate contact determination flag (Step S6); and then performs the process of Step S3 and ends the process.

When determining in Step S5 that the voltage value (x) is not greater than the constant β, meanwhile, the processor 7 determines whether the plate contact determination flag is set (Step S7). When determining in Step S7 that the plate contact determination flag is set, the processor 7 proceeds to a process to determine whether or not the plate contact timer is up (Step S8). When determining that the plate contact determination flag is not set, the processor 7 performs the process of Step S3 and ends the process. As described above, the processor 7 determines that the movable plate 4a and the fixed plate 4b are contacted, when the difference of the input voltage values between determination of the preceding input voltage value and determination of the current input voltage value exceeds the threshold constant β.

When determining in Step S8 that the plate contact timer is up, the processor 7 determines that the movable plate 4a and the fixed plate 4b are contacted for a predetermined time, and then outputs a plate contact determination signal and activates the limit switch LS (Step S9). When determining in Step S8 that the plate contact timer is not up, meanwhile, the processor 7 performs the process of Step S3 and then ends the process.

The processor 7 outputs the plate contact determination signal externally through the plate contact signal outputter in Step S9. Further, the processor 7 outputs a drive signal to the limit switch LS, the drive signal driving the limit switch LS so as to displace the limit switch LS from the open status to the close status. Thereafter, the processor 7 performs the process of Step S3, and then ends the process. When the limit switch LS is displaced to the close status, the power is supplied to the force coil 3a through the power inputter 9. The pendulum 3 is then swiftly displaced in a direction distancing the movable plate 4a and the fixed plate 4b. The electrostatic capacitance is subsequently generated between the electrodes, as described above, and thus the pendulum 3 normally performs a vibration operation. The structure above shortens a contact time between the movable plate 4a and the fixed plate 4b, thereby preventing wear and damage due to contact and achieving excellent durability.

As described above, the processor 7 outputs the plate contact determination signal or drives the limit switch LS, only after the input voltage value is 0 and the status continues for a predetermined time. Thereby, malfunction due to noise and the like can be prevented.

The processor 7 thus constitutes a plate contact determinator determining the plate contact by detecting that the detection signal output by the detection signal outputter changes to the detection signal associated with the current supplied by the current supplier in an amount associated with the removed charge.

An output status of the detection signal generated by the current circuit and the load resistor R of the force coil 3a is explained below. FIG. 3A to 3C are timing charts illustrating exemplary output statuses of the detection signal. In the charts, a horizontal axis indicates an elapse of time (t); a vertical axis indicates an output voltage of the detection signal. The constant α in the drawings represents the voltage value converted from the current supplied from the servo amplifier to the force coil 3a, at a maximum amplitude before the movable plate 4a and the fixed plate 4b are contacted.

FIG. 3A illustrates the output status of the detection signal when vibration is applied to the pendulum 3 at a rate of acceleration within a maximum rating. When the vibration is applied to the pendulum 3 at the rate of acceleration within the maximum rating, specifically when the vibration is applied at an amplitude in which the vibration can be detected, as the current is supplied externally or to the test coil 3b, the electrostatic capacitance between the movable plate 4a and the fixed plate 4b changes in accordance with the displacement of the pendulum 3 from the neutral position. When a signal indicating the change in the electrostatic capacitance is then input to the servo amplifier 6 from the movable plate 4a and the fixed plate 4b, which constitute the displacement detector 4, the current in an amount associated with the change in the electrostatic capacitance is supplied to the force coil 3a. The amount of the current supplied from the servo amplifier 6 to the force coil 3a herein is proportional to a displacement amount of the pendulum 3 from the neutral position. When the current is supplied to the force coil 3a, the force coil 3a then generates an electromagnetic force by the function of the magnet 2. As a result, the pendulum 3 attempts to return to the predetermined neutral position, against an inertia force in a displaced direction, and thus the displacement amount of the pendulum 3 from the neutral position is less. The operations above are performed until the vibration applied to the pendulum 3 ends. Consequently, the detection signal is output so as to form a certain waveform, as shown in FIG. 3A.

When the vibration detector 1 is measured, measurement is not necessarily performed anytime by applying a rate of acceleration within the maximum rating of the vibration detector, or vibration at an amplitude within a range in which vibration can be detected. When a limit value of the vibration detector 1 is measured, for instance, measurement is performed by intentionally contacting the movable plate 4a and the fixed plate 4b, and a rate of acceleration when the plates are contacted is considered as the limit value. The measurement is performed by supplying to the test coil 3b, the current in an amount providing a sufficient rate of acceleration for the plates to be contacted. In addition, the vibration detector 1 may be unable to accurately measure the rate of acceleration, because elasticity of the support sprint 5 is reduced or the vibration detector 1 itself is deformed, due to aging degradation and impacts, such as a drop and the like. Normally, the vibration detector 1 is directly mounted to a measurement object, such as a seismic measurement device, a liquid crystal correction laser apparatus, a vibration isolator, and the like. Since the vibration detector 1 is mostly mounted to a location difficult to directly access, such as in the earth or inside the apparatus, it can not be easily removed for inspection and maintenance. Thus, the test coil 3b is also used in a case to measure whether or not the vibration detector 1 normally operates. The measurement is performed by supplying to the test coil 3b, the current in an amount providing the maximum amplitude in which vibration can be detected. When the detection signal regularly forms a certain waveform as a result, it is detected that the operation is normal. When the waveform is irregular, it is detected that the vibration detector 1 has a certain abnormality.

When the movable plate and the fixed plate are collided, the pendulum is no more apart from the neutral position. Since the movable plate and the fixed plate in a conventional vibration detector are insulated against each other, the displacement amount of the pendulum is thus constant during a period when the movable plate and the fixed plate are contacted. Specifically, the electrostatic capacitance between the movable plate and the fixed plate is constant, and, accordingly, a constant amount of the current is supplied from the servo amplifier to the force coil. Thus, the detection signal is output at a constant level, as shown with a solid line of FIG. 3B. In the structure above, the detection signal continues to be output regardless of the contact of the plates. Even when the plates are contacted, it is thus difficult to immediately notice the status from a graph indicating output results of the signal, in which a waveform may be irregular. In validation of the limit value of the rate of acceleration of the vibration detector, for example, it is therefore difficult to accurately obtain validation results. Further, even when the vibration detector has an abnormality, the abnormality is overlooked, thus causing misjudgment on necessity of replacement of the vibration detector. Furthermore, when the contact of the plates is detected and then a predetermined process is performed, the output results of the detection signal are hardly different from those in normal operation, particularly when the plates are collided momentarily, and thus there is a case in which detection fails on the contact of the plates. The conventional vibration detector cannot accurately determine properties and statuses of the vibration detector.

In the embodiment of the present invention, the movable plate 4a and the fixed plate 4b are conducted to each other. Thereby, when the movable plate 4a and the fixed plate 4b are contacted, the charge between the plates is removed. Consequently, when the plates are contacted with each other, the movable plate 4a and the fixed plate 4b have an equal electric capacitance. An amount of the current supplied from the servo amplifier 6 is an amount associated with the removal of the charge between the plates, that is, substantially 0. Thus, the output status of the detection signal is accordingly 0. Thereby, when the pendulum 3 is vibrated such that the movable plate 4a and the fixed plate 4b are contacted, the output status of the detection signal is substantially displaced to 0 during a time when the movable plate 4a and the fixed plate 4b are contacted, as shown with a solid line of FIG. 3C, and the status remains until the movable plate 4a and the fixed plate 4b are separated. In the drawing, t2 represents a determination time of the plate contact timer set in Step S6 of the plate contact determination process, as shown in FIG. 2. In the structure above, when the limit value of the rate of acceleration of the vibration detector 1 is reached, the limit value can easily be detected from the output status of the detection signal, since the output status is substantially displaced. Further, when the vibration detector 1 has an abnormality, the abnormality can easily be detected. Specifically, properties and statuses of the vibration detector can accurately be determined in the embodiment of the present invention.

In the embodiment of the present invention, as explained above, when the pendulum is vibrated and the movable plate and the fixed plate are contacted, the charge between the plates is removed by the remover. Then, the detection signal outputter changes the detection signal indicating that the current is supplied from the current supplier in the amount associated with the electrostatic capacitance between the plates, to the detection signal indicating that the current is supplied in the amount associated with the removed charge between the plates. When the change status continues for a predetermined time, the plate contact determinator determines the plate contact. Thereby, the limit of the detection range of the vibration detector can accurately be known. In addition, whether or not the vibration detector operates normally can accurately be obtained in a test operation. Thus, properties and statuses of the vibration detector can accurately be determined. Further, an impact of erroneous detection due to noise and the like can be contained.

According to the embodiment of the present invention, a change amount of the voltage output per hour by the detection signal outputter is significant when the plates are contacted. Thus, the plate contact can surely be determined based on determination of the plate contact from the amount of change.

In the embodiment of the present invention, when the pendulum is vibrated and the movable plate and the fixed plate are contacted, the charge between the plates is removed by the remover. Then, the detection signal outputter changes the detection signal indicating that the current is supplied from the current supplier in the amount associated with the electrostatic capacitance between the plates, to the detection signal indicating that the current is supplied in the amount associated with the removed charge between the plates. The plate contact determinator determines the plate contact from the change. At the time, the change amount of the voltage output per hour by the detection signal outputter is significant. Thus, the plate contact can be determined based on determination of the plate contact from the amount of change. Thereby, the limit of the detection range of the vibration detector can accurately be known. In addition, whether or not the vibration detector operates normally can accurately be obtained in a test operation. Thus, properties and statuses of the vibration detector can accurately be determined.

In the embodiment of the present invention, the current supplied from the servo amplifier 6 to the force coil 3a is 0, when the charge between the movable plate 4a and the fixed plate 4b is removed as the plates are conducted. Alternatively, the current may be supplied in an amount substantially different from the current amount supplied immediately before the plates are conducted. It is preferable that a change in the supplied current amount be substantial, such as, for example, 1/10 or 10 times the current amount supplied immediately before the plates are conducted.

Further, in the embodiment of the present invention, the processor 7 determines the plate contact, when the input voltage value of the detection signal is 0; the processor 7 determines that the voltage value (x) stored before the time t1 is greater than the threshold β; and then the predetermined determination time elapses from the time when the input voltage value of the detection signal is 0. The processor 7 then outputs the plate contact determination signal and activates the limit switch LS. Alternatively, the processor 7 may be set to determine the plate contact, when the input voltage value is 0, and then the processor 7 determines that the voltage value (x) stored before the time t1 is greater than the threshold β, without waiting for the determination time.

Furthermore, in the embodiment of the present invention, when the input voltage value of the detection signal is 0, and the voltage value (x) stored before the time t1 is greater than the threshold β, the processor 7 determines that the input voltage value is displaced to 0, based on that the charge between the plates is removed at once as the movable plate 4a and the fixed plate 4b are contacted. Instead of performing the determination above, the processor 7 may be set to determine the plate contact, only based on that the predetermined determination time elapses from the time when the input voltage value of the detection signal is 0.

Furthermore, in the embodiment of the present invention, the power is supplied to the force coil 3a via the limit switch LS, when the movable plate 4*a* and the fixed plate 4*b* are contacted. The structure above, however, may not be provided.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The present invention is not limited to the above-described embodiments, and various variations and modifications may be possible without departing from the scope of the present invention.

What is claimed is:

1. A servo-type vibration detector comprising:
   a pendulum supported by a fixed member and displaceable by external vibration;
   a movable electrode affixed to the pendulum;
   a driver configured to drive the pendulum;
   a fixed electrode positioned opposite the movable electrode;
   an electrostatic capacitance detector configured to detect an electrostatic capacitance between the movable electrode and the fixed electrode;
   a current supplier configured to supply a current to the driver in an amount associated with a detection result of the electrostatic capacitance detector, such that the pendulum is displaced and driven to a predetermined neutral position;
   a detection signal outputter configured to output a detection signal associated with the amount of the current supplied by the current supplier;
   a remover configured to remove a charge between the electrodes, when the movable electrode and the fixed electrode contact each other; and
   an electrode contact determinator configured to determine an electrode contact by detecting that the detection signal output from the detection signal outputter changes to a detection signal associated with the current supplied from the current supplier in an amount associated with the removed charge, wherein the electrode contact determinator determines the electrode contact when a predetermined determination time elapses in a detection state, after detecting the change to the detection signal associated with the current supplied from the current supplier in the amount associated with the removed charge.

2. The servo-type vibration detector according to claim 1, wherein
   the detection signal outputter is further configured to output a voltage in an amount associated with the amount of the current supplied by the current supplier; and
   the electrode contact determinator is further configured to determine the electrode contact when a difference in change of the voltage exceeds a predetermined threshold, the voltage being output per a predetermined time by the detection signal outputter.

3. A servo-type vibration detector comprising:
   a pendulum supported by a fixed member and displaceable by external vibration;
   a movable electrode affixed to the pendulum;
   a driver configured to drive the pendulum;
   a fixed electrode positioned opposite the movable electrode;
   an electrostatic capacitance detector configured to detect an electrostatic capacitance between the movable electrode and the fixed electrode;
   a current supplier configured to supply a current to the driver in an amount associated with a detection result of the electrostatic capacitance detector, such that the pendulum is displaced and driven to a predetermined neutral position;
   a detection signal outputter configured to output a detection signal associated with the amount of the current supplied by the current supplier;
   a remover configured to remove a charge between the electrodes, when the movable electrode and the fixed electrode contact each other; and
   an electrode contact determinator configured to determine an electrode contact by detecting that the detection signal output from the detection signal outputter changes to a detection signal associated with the current supplied from the current supplier in an amount associated with the removed charge, wherein:
   the detection signal outputter is further configured to output a voltage in an amount associated with the amount of the current supplied by the current supplier; and
   the electrode contact determinator is further configured to determine the electrode contact when a difference in change of the voltage exceeds a predetermined threshold, the voltage being output in accordance with a predetermined time by the detection signal outputter.

\* \* \* \* \*